July 14, 1936.  E. A. JOHST  2,047,635

HAND PROTECTOR

Filed Dec. 30, 1935

EUGENE A. JOHST

INVENTOR

BY John P. Nikonow

ATTORNEY

Patented July 14, 1936

2,047,635

UNITED STATES PATENT OFFICE 2,047,635

HAND PROTECTOR

Eugene A. Johst, New York, N. Y.

Application December 30, 1935, Serial No. 56,623

3 Claims. (Cl. 16—116)

My invention relates to hand protectors and has particular reference to protecting pads used for grasping and holding hot objects, such as kitchen utensils and, particularly, their handles.

The object of my invention is to provide a pad made of a heat insulating material, formed into a U-shaped holder and adapted to be conveniently held in the user's hand and placed over a handle of a kitchen utensil.

Another object of my invention is to provide a U-shaped hand protector made of a material sufficiently resilient to retain its shape when placed in an inverted position on a table or similar surface.

Another object of my invention is to provide a hand protector in the form of a U-shaped holder having diverging sides adapted to be placed over handles of kitchen utensils or similar articles, the holder being of sufficient resiliency to retain its shape and stand on the end portions of its sides when placed in an inverted position on a table, and of sufficient flexibility to be folded over a handle of a utensil.

Another object of my invention is to provide a U-shaped protective holder having folds, corrugations or ridges on its sides so as to facilitate grasping and holding the protector by the fingers.

Still another object of my invention is to provide a U-shaped hand protector made of a resilient material and lined inside with a layer of relatively soft and flexible heat insulating material; and this material may be further formed with additional loose folds so as to facilitate its engagement with utensil handles and provide a better grip over the same.

Still another object of my invention is to provide a U-shaped hand protector with diverging sides, the ends of the sides being curved outward so as to form additional protection for the user's fingers, the protector being adapted to rest on the convex ends of the sides when placed on a table.

My invention is more fully described in the accompanying specification and drawing in which—

Figure 1:
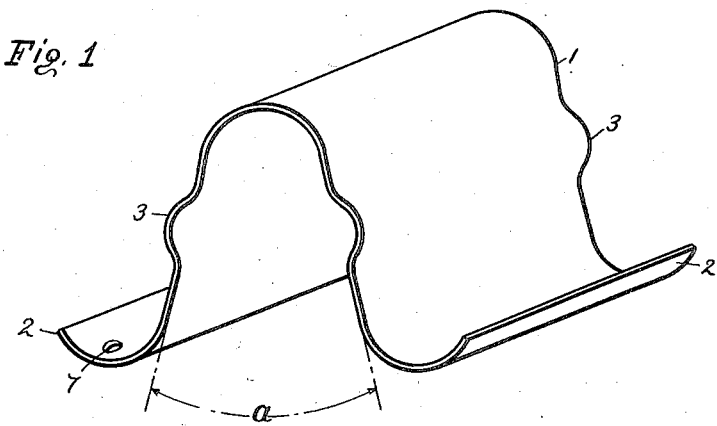
Figure 2:
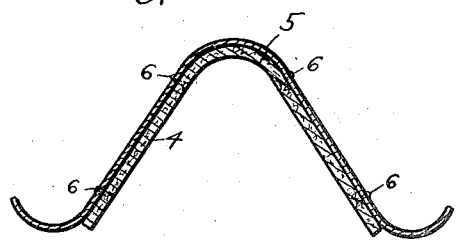
Figure 3:
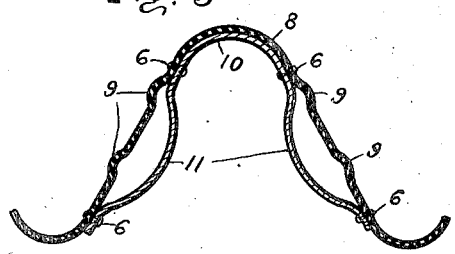
Figure 4:
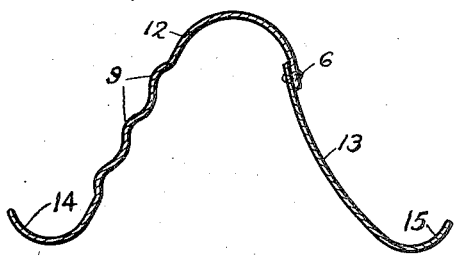

Fig. 1 is a perspective view of my hand protector having longitudinal projections on its sides, Fig. 2 is a sectional view of a modified protector having an inside lining, Fig. 3 is a sectional view of another modification having loose folds inside, and Fig. 4 is a sectional view of another modification with sides made of different materials.

My hand protector consists of a piece of sheet material 1 preformed in a U-shape. The end portions of the sides of the protector are curved outward as shown at 2. The size of the protector is such that it can be conveniently held in a hand with the fingers resting in the concave sides of the curved ends 2, the upper portion of the protector resting in the palm of the hand. The sides are preferably made diverging in order to facilitate placing the protector over objects of various sizes, such as handles of kitchen utensils. The sides may be provided with longitudinal projections 3. These projections help to retain the protector in a hand and, also, they help to retain a handle over which the protector is placed. These projections can be conveniently formed as folds or corrugations of the material itself, the folds being convex on the outside and concave inside. The protector thereby forms a holder for handles and serves to protect the user's hand from the heat of such handles or utensils themselves.

The material 1 is of sufficient resiliency so as to retain its shape when the holder is placed by its curved ends 2 on a table, and to regain this shape after use. It also must be sufficiently flexible to be easily bent over a handle and even partly enfold the same. I have found that rubber compositions can be used for this purpose, the rubber being vulcanized to a desired degree of resiliency and flexibility. Other similar materials can be also used, such as fiber, asbestos composition etc. The surface of the material can be roughened on the outside to prevent its slippage under the fingers. It may be also roughened on the inside to provide better grip on utensil handles.

A separate lining 4 may be provided on the inside of the protector 5 as shown in Fig. 2. This lining is preferably made of a relatively soft and flexible material, resisting heat, such as asbestos etc., and it may not be resilient if the protector itself has sufficient resiliency. The latter then may not necessarily be made of a heat resisting material. It is fastened with rivets 6.

Holes 7 are provided at the ends of the sides of the protector for hanging the latter on a nail on the wall.

The angle "a" between the sides of the protector may be of any suitable size, even zero, although I prefer the sides to diverge at an angle less than 90°.

Another modification is shown in Fig. 3. Here the protector 8 has several small ridges or corrugations 9 and has a lining 10 of a flexible heat resisting material fastened with rivets 6. It forms loose folds 11 which facilitate the proper enclosing of a utensil handle by the protector and help to retain a grip on the handle.

Another modification is shown in Fig. 4. The protector in this case has one side 12 made of a semi-flexible material provided with gripping corrugations 9 and a curved end 15. The other side 13 is made of a relatively flexible material, for instance, a softer grade of rubber or asbestos fabric, and it is fastened to the portion 12 by rivets 6. The side 13 also has a finger protecting curved end portion 15, the material being sufficiently resilient to retain the shape of this curve.

Important advantages of my hand protector are that it can be made cheaply out of a single piece of sheet material such as rubber, rubberized fabric, asbestos fabric etc.; being made of a solid material, it is sanitary and can be easily washed and even sterilized if necessary; having a U-shape with deep sides, it can be easily grasped in a hand between the thumb and the other fingers, the corrugations materially helping to retain the hold of the protector even if it becomes wet or oily; the same corrugations help to retain a better hold on the handle of a utensil; separate inside lining helps to render the protector better protected in case of very hot utensils; additional loose folds on the lining facilitate holding the utensil handles; and a protector having one side more flexible than the other is useful in case of asymmetric or odd-shaped handles.

It is understood that my protector may be further modified without departing from the spirit of my invention.

I claim as my invention:

1. A hand protector consisting of a single piece of a heat resisting, flexible and resilient sheet material formed into a U-shaped holder with diverging sides, the edges of the sides being curved outward, the middle portions of the sides of the holder being curved outward so as to form convex ridges on the outside and corresponding grooves on the inside.

2. A hand protector consisting of a single piece of a heat resisting, flexible and resilient sheet material formed into a U-shaped holder with diverging sides, each side of the holder being curved in the middle so as to form a longitudinal ridge on the outside and a corresponding groove on the inside, the edge portions of the holder being provided with apertures for hanging the same.

3. A hand protector consisting of a piece of a heat resisting, flexible and resilient material formed into a U-shaped holder, the sides of the holder being folded into longitudinal corrugations in their middle portions so as to provide a hand grip on the outside and corresponding inversely curved portions on the inside for engaging utensil handles.

EUGENE A. JOHST.